Feb. 10, 1942.   V. J. CHAPMAN   2,272,737
BURR REMOVER
Filed July 18, 1940

Inventor:
Verni J. Chapman,
by Harry E. Dunham
His Attorney.

Patented Feb. 10, 1942

2,272,737

UNITED STATES PATENT OFFICE 2,272,737

BURR REMOVER

Verni J. Chapman, Schenectady, N. Y., assignor to General Electric Company, a corporation of New York Application July 18, 1940, Serial No. 346,157

4 Claims. (Cl. 90—25)

My invention relates to welding apparatus and more particularly to resistance butt welding apparatus.

In butt welding of the type in which abutting objects to be welded are first heated by an arc struck between the surfaces to be joined and then forced together to form the weld, a certain amount of metal is upset or extruded at the joint, thereby forming a bead of extruded metal. In most cases it is desirable to shear or trim the bead after the welding operation has been completed.

It is an object of my invention to provide new and improved means which is relatively inexpensive and simple of construction and operation for rapidly and effectively removing the bead.

Further objects and advantages of my invention will become apparent as the following description proceeds and the features of novelty which characterize my invention will be pointed out with particularity in the claims annexed to and forming a part of this specification.

Figure 1:
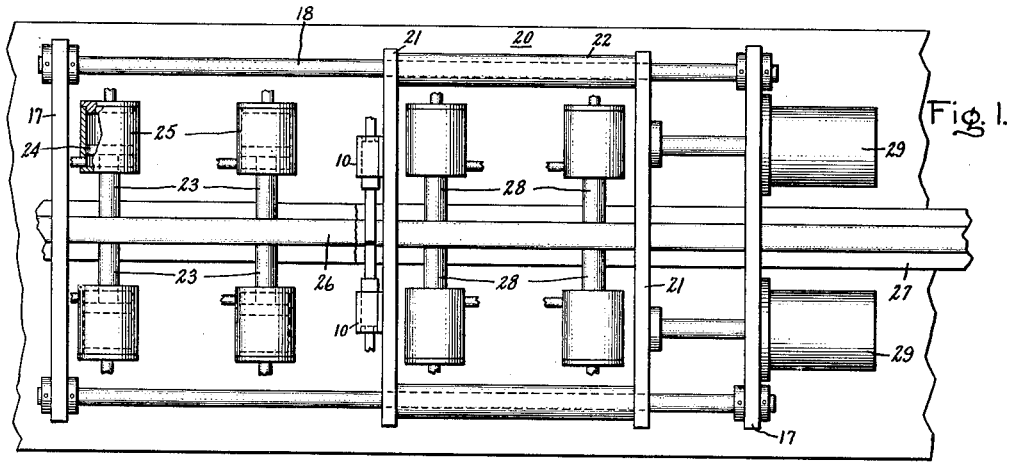
Figure 2:
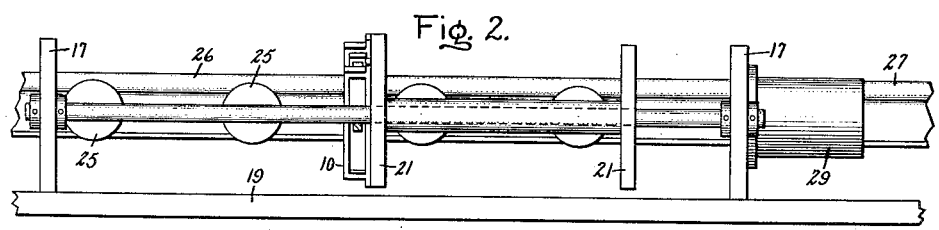
Figure 3:
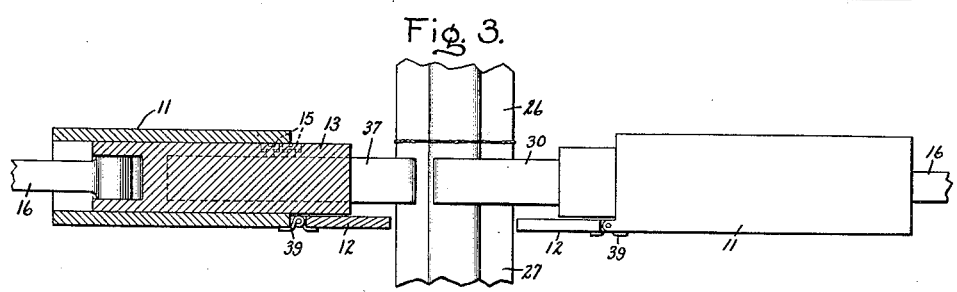
Figure 4:
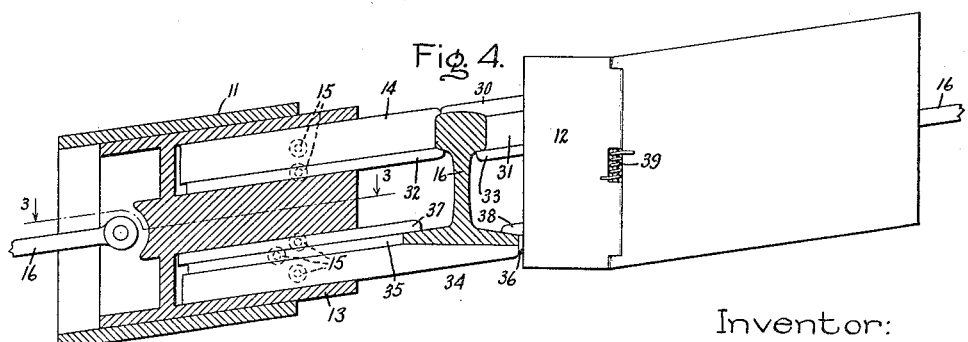

For a better understanding of my invention reference may be had to the accompanying drawing in which Fig. 1 is a plan view of apparatus embodying the principles of my invention for trimming the bead from welded rails; Fig. 2 is a side elevational view of the apparatus disclosed in Fig. 1; Fig. 3 is an enlarged plan view, partly in section, of the flash trimmer disclosed in Figs. 1 and 2, the section being taken along the line 3—3 of Fig. 4; and Fig. 4 is an enlarged side elevational view, partly in section, of the flash trimmer shown in Fig. 3.

Referring to the drawing, I have provided flash or bead trimmers 10 for removing extruded metal from a weld. While there is illustrated a pair of trimming devices 10, subsequent description will be limited, in the main, to but one of the devices, the other being similar in construction. The trimmer includes an open-ended casing 11, a door 12 for normally closing the open end thereof and a reciprocable tool holder 13 slidable within the casing 11. A plurality of tools, such as 14, are supported within the tool holder 13, each of the tools being secured within the holder as by means of a set screw 15. Means such as a lever 16 is provided for imparting motion to the holder 13 and tools contained therein. During operation of the trimming device, the tool holder is moved toward the article to be worked on and the door 12 is pushed open upon engagement of the tools therewith. Upon further movement of the tool holder the cutting edges of the tools engage the article to be worked on. Thereafter, movement of the tool holder and tools across the weld will result in shearing the bead from the welded joint.

There is illustrated in the drawing in somewhat diagrammatical fashion a resistance or flash welding device equipped with a bead or flash removing means 10 embodying the principles of my invention. The apparatus disclosed is particularly adapted for welding rails. The welding machine illustrated comprises a frame including end members 17 and side arms 18 suitably supported from a base member or support 19. A movable platen 20 is slidably carried on the side arms 18. As illustrated, the platen comprises end members 21 and tubular side members 22 arranged to slide over the side arms 18 of the frame. In order to hold the rail 26 in a fixed and immovable position, during the welding and shearing operations, I have provided a set of combined clamps and terminals 23 suitably supported from the frame or base of the welding apparatus. The clamping terminals are preferably operated by pistons 24 reciprocably arranged in fluid pressure cylinders 25. Any suitable arrangement may be employed but preferably oil supplied from a suitable source, not shown, in a manner to permit clamping or unclamping of the rail 26 at will is employed. The second rail length 27 is similarly clamped by a second set of combined clamps and terminals 28 supported in a suitable manner from the movable platen 20.

In order to effect longitudinal movement of the rail 27 with respect to the rail 26 I have provided fluid pressure push-up cylinders 29 suitably supported on the end member 17 adjacent the movable rail 27 and controlled in any suitable manner for moving the rail 27 to or from the rail 26.

In order to trim or shear the bead formed during the welding operation, I have provided shearing or trimming devices 10. Any suitable means may be used for moving the device transversely of the rail. For example, a hydraulic device, not shown, acting on the rod or lever 16 which is preferably pivotally attached to the tool holder 13 will perform satisfactorily.

In the illustrative form of my invention, the tool holder 13 is substantially rectangular and box-like in appearance although any desired shape may be employed. In order to provide a guide for the tool holder I have provided a housing 11 open at the ends thereof and attached in any suitable way, not shown, to the front end of the movable platen 20.

For removing the trim I have provided a plurality of tools, an individual tool being provided for each portion to be trimmed. Thus tool 30 is provided for trimming the top of the rail head, tools 14 and 31 for shearing the sides of the head, tools 32 and 33 for shearing the under surfaces of the head, tool 34 for shearing the bottom of the rail, tools 35 and 36 for trimming the sides or outside edges of the rail flanges and tools 37 and 38 for trimming the top sides of the flanges. While the arrangement illustrated employs ten separate tools for trimming the head and flanges of the rail, it will be understood that the number and arrangement of tools is determined by the shape of the articles joined together and also by the amount of surface to be trimmed.

The tools are held in their proper positions by suitable means, as individual set screws 15, for example, so that each tool can be adjusted to its most advantageous position independently of the other tools. The cutting edges or portions of the tools are shaped to fit the contours of that portion of the work with which they are associated. The casings are mounted on the platen in such a way that all tools have access to the portions to be trimmed. In the illustrated form of my invention the tools 14, 32, 34, 35 and 37 are tilted upwardly from a position slightly below the portion to be trimmed whereas the assembly on the other side of the rail is tilted slightly downwardly from a position a little above the portion to be trimmed. By thus angularly disposing the tools with respect to the rail, good contact with the surface to be trimmed is insured.

In order to protect the tools and tool holders from the flash thrown off during the welding, a trap door 12 is provided on the ends of the casings or housings 11 nearest the weld. The doors 12 are biased as by springs 39 to the closed position of the doors so that they are opened by the tools during movement thereof into trimming position but moved to the closed position when the tools and tool holder are withdrawn into the casing 11. While I have shown an arrangement in which the tools themselves engage the door and force it open, other arrangements or means dependent upon movement of the tools or tool holder will be apparent to those skilled in the art.

In operation, the terminals 23 are connected to one side of the secondary of a welding transformer while the movable set of terminals 28 is connected to the other side of the transformer secondary. The transformer connections are well known to those skilled in the art and in order to keep the drawing as simple as possible the electrical apparatus has not been illustrated. After the current is applied to the transformer the fluid pressure system is operated to cause the push-up mechanism to move the rail 27 into sparking engagement with the rail 26. The rails are left in this position a sufficient time adequately to heat the metal at the joint, the proper length of time being determined by experiment. As soon as the proper temperature has been reached, the push-up mechanism is again operated to apply additional pressure to the joint and upset a portion of the metal at the joint forming a bead of extruded metal. Following this operation, the welding power is cut off and the terminals 28 loosened. In order to cut or trim the flash or bead, the push-up mechanism is again operated to advance the movable platen 20 and the flash trimmers 10 secured thereto. During this operation the combined clamps and terminals 28 remain in their released positions with the result that the platen 20 and the trimmers 10 are moved longitudinally of the welded rails 26 and 27 thereby advancing the cutting tools into engagement with the bead or flash. After completition of the trimming operation, the tools are withdrawn, the push-up mechanism is operated to retract the platen 20, the combined clamps and terminals 23 are loosened and the rail removed from the machine.

While I have shown a particular embodiment of my invention, I do not desire my invention to be limited to the particular construction shown and described and I intend in the appended claims to cover all modifications within the spirit and scope of my invention.

What I claim as new and desire to secure by Letters Patent of the United States is:

1. In butt welding apparatus, means for removing the bead from a weld comprising a casing open at one end, a door for closing said end, means normally holding said door in its closed position, a tool holder movably arranged within said casing, a cutting tool carried by said holder, fastening means for securing said tool in a predetermined position, means for moving said holder and said tool towards and away from the shearing position of the tools, means dependent upon such movement for opening said door to premit movement of said tool out of the casing and into engagement with the welded objects to be sheared, and means for moving said tool across the weld for removing the bead at the weld.

2. In a butt welding apparatus, means for removing the bead from a weld comprising a casing open at one end, a door for closing said end, means normally holding said door in its closed position, a tool holder movably arranged within said casing, a plurality of cutting tools carried by said holder, fastening means for securing each tool in a predetermined position, means for moving said holder and said tools toward and away from the shearing position of the tools, means dependent upon such movement for opening said door to permit movement of said tools out of the casing and into engagement with the welded objects to be sheared, and means for moving said tools across the weld for removing the bead at the weld.

3. In butt welding apparatus, means for removing the bead from a weld comprising a casing open at one end, a door for closing said end, means for biasing said door to its closed position, a tool holder reciprocably arranged within said casing, individual tools for each portion to be sheared, each of said tools being adjustable independently of the others, fastening means for securing each tool in a predetermined position in said tool holder, means for moving said holder and said tools toward and away from the shearing position of the tools, means dependent upon such movement for opening said door to permit movement of said tools out of the casing and into engagement with the welded objects to be sheared, and means for moving said tools across the weld for removing the bead at the weld.

4. In butt welding apparatus, means for removing the bead from a weld comprising a casing open at one end, closure means for closing said end, means for normally holding said closure means in its closed position, a tool holder movably arranged within said casing, a plurality of cutting tools carried by said holder, fastening means for securing each of said tools in a predeterminend position, means for moving said tools into engagement with said closure means for opening said closure means and thereafter moving said tools into engagement with the object to be trimmed, means for retracting said holder and said tools into said casing, and means for moving said tools across the weld for removing the bead at the weld.

VERNI J. CHAPMAN.